(12) United States Patent
Webb et al.

(10) Patent No.: US 9,426,611 B2
(45) Date of Patent: Aug. 23, 2016

(54) INFORMATION PROCESSING TERMINAL, INFORMATION PROCESSING METHOD, PROGRAM, AND INFORMATION STORAGE MEDIUM

(71) Applicants: Sony Computer Entertainment Inc., Tokyo (JP); Sony Computer Entertainment America LLC, Foster City, CA (US)

(72) Inventors: Jonathan Warren Webb, Foster City, CA (US); Eiichi Nishina, Tokyo (JP)

(73) Assignees: SONY INTERACTIVE ENTERTAINMENT INC., Tokyo (JP); SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 29 days.

(21) Appl. No.: 14/419,876
(22) PCT Filed: Aug. 6, 2013
(86) PCT No.: PCT/US2013/053704
§ 371 (c)(1),
(2) Date: Feb. 5, 2015
(87) PCT Pub. No.: WO2014/025724
PCT Pub. Date: Feb. 13, 2014

(65) Prior Publication Data
US 2015/0223016 A1    Aug. 6, 2015

Related U.S. Application Data

(60) Provisional application No. 61/681,311, filed on Aug. 9, 2012.

(51) Int. Cl.
| | |
|---|---|
| *H04W 24/00* | (2009.01) |
| *H04W 4/02* | (2009.01) |
| *H04W 4/18* | (2009.01) |
| *H04W 4/20* | (2009.01) |
| H04W 84/12 | (2009.01) |

(52) U.S. Cl.
CPC .............. *H04W 4/02* (2013.01); *H04W 4/028* (2013.01); *H04W 4/18* (2013.01); *H04W 4/185* (2013.01); *H04W 4/20* (2013.01); *H04W 84/12* (2013.01)

(58) Field of Classification Search
CPC ....... H04W 64/00; H04W 4/02; H04W 4/028; H04W 4/185; H04W 64/003; H04W 4/023

USPC .............. 455/404.1, 404.2, 456.1–457; 340/539.13, 988–996; D10/104.2
See application file for complete search history.

(56) References Cited

U.S. PATENT DOCUMENTS

| | | | |
|---|---|---|---|
| 8,145,255 B2 | 3/2012 | Rekimoto | |
| 2010/0232405 A1* | 9/2010 | Kikuchi | H04W 4/001 370/338 |
| 2011/0040870 A1* | 2/2011 | Wynn | H04L 63/0428 709/224 |

FOREIGN PATENT DOCUMENTS

| | | |
|---|---|---|
| EP | 2073562 A1 | 6/2009 |
| EP | 2184927 A1 | 5/2010 |
| JP | 2010130530 A | 6/2010 |

OTHER PUBLICATIONS

International Search Report and Written Opinion for corresponding PCT application PCT/US2013/053704, dated Feb. 28, 2014.
Office Action for corresponding JP Patent Application No. 2015-524509, 3 pages, dated Jan. 19, 2016.
International Preliminary Report on Patentability for corresponding PCT application PCT/US2013/053704, dated Feb. 19, 2015.

* cited by examiner

*Primary Examiner* — Ronald Eisner
(74) *Attorney, Agent, or Firm* — Matthew B. Dernier, Esq.

(57) ABSTRACT

A server transmits location information based on identification information of at least one access point in response to the reception of the identification information, the time of reception of identification information of an access point that is associated with a location indicated by the location information received from the server is associated with the indicated location, irrespective of the time of reception of the location information. Identification information of an access point is received and is associated with reception time information that indicates the time of reception of the identification information. The identification information associated with the reception time information is transmitted to a location information providing server. Location information based on the transmitted identification information is received and is associated with reception time information that is associated with the transmitted identification information.

7 Claims, 4 Drawing Sheets

| MANAGE-MENT ID | RECEPTION DATE/TIME DATA | LOCATION-ASSOCIATED ID DATA | LOCATION INFORMATION DATA | |
|---|---|---|---|---|
| | | | | |
| | | | | |
| 0001 | 04/01/2012 15:14:30 | aa:aa:aa:aa:aa:aa bb:bb:bb:bb:bb:bb cc:cc:cc:cc:cc:cc | 35°45′15″ N 134°47′30″ E | } 40 |
| | | | | |
| | | | | |
| 0101 | 04/05/2012 13:35:16 | dd:dd:dd:dd:dd:dd ee:ee:ee:ee:ee:ee | | } 40 |
| 0102 | 04/05/2012 14:01:45 | ff:ff:ff:ff:ff:ff | | } 40 |
| 0103 | 04/05/2012 14:32:16 | gg:gg:gg:gg:gg:gg | | } 40 |
| | | | | |

INFORMATION PROCESSING TERMINAL, INFORMATION PROCESSING METHOD, PROGRAM, AND INFORMATION STORAGE MEDIUM

CROSS-REFERENCE TO RELATED APPLICATIONS

The present application claims the benefit of U.S. Provisional Application No. 61/681,311 filed on Aug. 9, 2012, the content of which is hereby incorporated by reference into this application.

BACKGROUND OF THE INVENTION

1. Field of the Invention

The present invention relates to an information processing terminal, an information processing method, a program, and an information storage medium.

2. Description of the Related Art

In recent years, there are a growing number of services that provide an information processing terminal such as a cellular phone or a portable game terminal with information based on the current location of the information processing terminal. Technologies for estimating the current location of the information processing terminal are used in such services. An example of the technologies is disclosed in Patent Literature 1, where the terminal receives a beacon transmitted from a wireless LAN base station (access point) and transmits the signal strength of the beacon to location estimation device, to thereby estimate the location of the terminal by the location estimation device based on the received signal strength and the location of the wireless LAN access point that is registered in advance.

CITATION LIST

Patent Literature

Patent Literature 1: U.S. Pat. No. 8,145,255

SUMMARY OF THE INVENTION

Technical Problem

A possible example of the services is as follows. The information processing terminal receives identification information (e.g., the MAC address) of at least one access point (e.g., a wireless LAN (e.g., Wi-Fi (registered trademark)) access point or an access point of a cellular phone network) that is present in the communication range of the information terminal. The information processing terminal transmits the received identification information to a server that transmits location information (e.g., the latitude and longitude, information indicating the address, or XY coordinates) based on access point identification information in response to the reception of the access point identification information. The information processing terminal receives the location information from the server. And, the information processing terminal treats the location indicated by the received location information as the current location of the information processing terminal in the service.

However, when, for example, the communication range of the information processing terminal includes an access point that does not grant the information terminal access to a network (e.g., an access point provided by a provider to which the user of the information processing terminal does not subscribe), but does not include an access point that grants the information processing terminal access to a network (e.g., an access point provided by a provider to which the user of the information processing terminal subscribes), in short, when communication between the information processing terminal and the server described above is not possible, the information processing terminal can receive the access point identification information but cannot receive the location information.

The user could receive the location information from the server by carrying the information processing terminal to the location where the communication between the information processing terminal and the server is possible.

In this case, however, the time of reception of the location information differs from the time of reception of identification information of the access point that is associated with the location indicated by the location information. Therefore, the information processing terminal needs to manage the time of reception of the access point identification information in order to associate the location indicated by the received location information with the time of reception of the identification information of the access point that is associated with the indicated location.

The present invention has been made in view of the problem described above, and an object of the present invention is therefore to enable, in a configuration where a server transmits the location information based on the identification information of at least one access point in response to the reception of the identification information, associating the time of reception of the identification information of an access point that is associated with the location indicated by the location information received from the server with the indicated location, irrespective of the time of reception of the location information.

Solution to Problem

In order to solve the above-mentioned problem, according to an exemplary embodiment of the present invention, there is provided an information processing terminal, including: a reception unit;
a transmission unit; and a control unit, in which the reception unit receives, from an access point, identification information of the access point, the control unit associates identification information of at least one access point with reception time information that indicates a time of reception of the identification information, the transmission unit transmits, to a server that transmits, in response to reception of the identification information, location information based on the identification information, identification information that is associated with the reception time information, the reception unit receives, from the server, location information based on the transmitted identification information, and the control unit associates the received location information with the reception time information that is associated with the transmitted identification information.

Further, according to an exemplary embodiment of the present invention, there is provided an information processing method, including: receiving, from an access point, identification information of the access point; associating identification information of at least one access point with reception time information that indicates a time of reception of the identification information; transmitting, to a server that transmits, in response to reception of the identification information, location information based on the identification information, identification information that is associated with the reception time information; receiving, from the server, location information based on the transmitted identification information; and associating the received location information with the reception time information that is associated with the transmitted identification information.

Further, according to an exemplary embodiment of the present invention, there is provided a program which is to be executed by a computer, the program including instructions to: receive, from an access point, identification information of the access point; associate identification information of at least one access point with reception time information that indicates a time of reception of the identification information; transmit, to a server that transmits, in response to reception of the identification information, location information based on the identification information, identification information that is associated with the reception time information; receive, from the server, location information based on the transmitted identification information; and associate the received location information with the reception time information that is associated with the transmitted identification information.

Further, according to an exemplary embodiment of the present invention, there is provided a computer-readable information storage medium having stored thereon a program which is to be executed by a computer, the program including instructions to: receive, from an access point, identification information of the access point; associate identification information of at least one access point with reception time information that indicates a time of reception of the identification information; transmit, to a server that transmits, in response to reception of the identification information, location information based on the identification information, identification information that is associated with the reception time information; receive, from the server, location information based on the transmitted identification information; and associate the received location information with the reception time information that is associated with the transmitted identification information.

In the exemplary embodiment of the present invention, the identification information of at least one access point is associated with the time of reception of the identification information. The location information based on the identification information is received from the server. The time of reception that is associated with the identification information is then associated with the received location information. The exemplary embodiment of the present invention thus enables, in a configuration where a server transmits the location information based on the identification information of at least one access point in response to the reception of the identification information, associating the time of reception of the identification information of an access point that is associated with a location indicated by the location information received from the server with the indicated location, irrespective of the time of reception of the location information.

In the exemplary embodiment of the present invention, the transmission unit transmits, to the server, a plurality of pieces of identification information at once that are associated with pieces of reception time information that indicate reception times different from one another, and the reception unit receives, from the server, for each of the plurality of pieces of identification information transmitted at once, location information based on the each of the plurality of pieces of identification information.

Further, in the exemplary embodiment of the present invention, the transmission unit transmits, to the server, via an access point that is different from an access point identified by identification information that is associated with the reception time information, the identification information that is associated with the reception time information.

Further, in the exemplary embodiment of the present invention, the information processing terminal further includes a memory unit for storing a plurality of pieces of information in which identification information of at least one access point is associated with reception time information that indicates a time of reception of the identification information.

DESCRIPTION OF EMBODIMENTS

An embodiment of the present invention is described in detail below with reference to the drawings.

Figure 1:
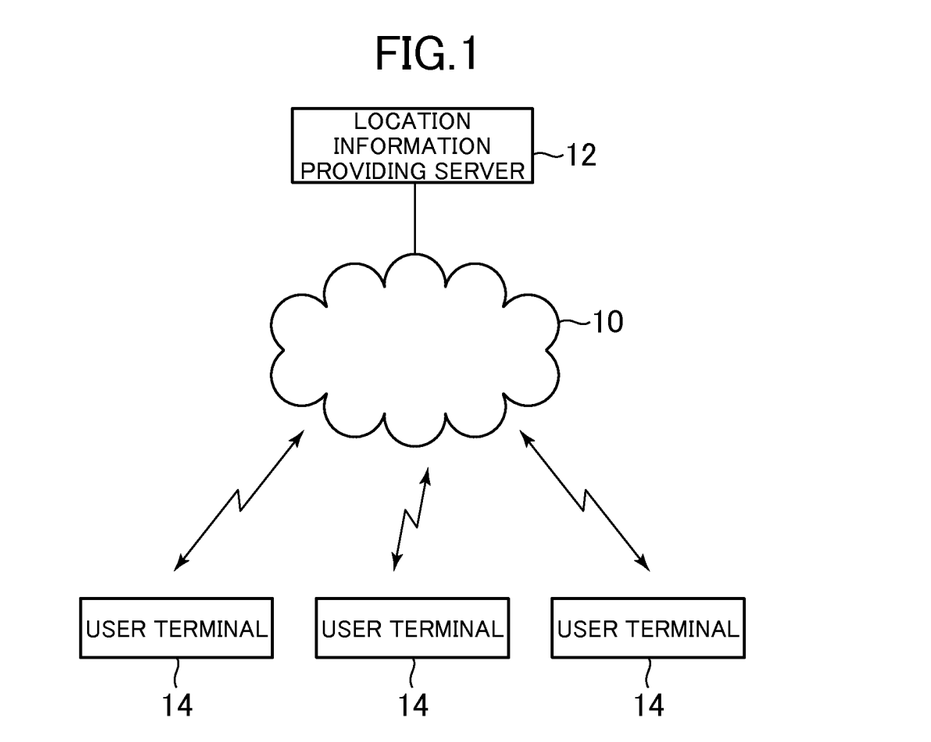
FIG. 1 is an overall configuration diagram of an information processing system according to an embodiment of the present invention.

FIG. 1 is an overall configuration diagram of an information processing system according to the embodiment of the present invention. As illustrated in FIG. 1, a location information providing server 12 and a plurality of user terminals (information processing terminals) 14 are connected to a computer network 10, which is the Internet or the like, in this information processing system.

The location information providing server 12 is built around a known server computer that includes, for example, a control unit, a memory unit, and a communication unit. The control unit is a program control device such as a CPU that operates as programmed by a program installed in the location information providing server 12. The memory unit includes, for example, a memory element such as a ROM or a RAM, and a hard disk drive. The communication unit is a network board or the like.

Figure 2:
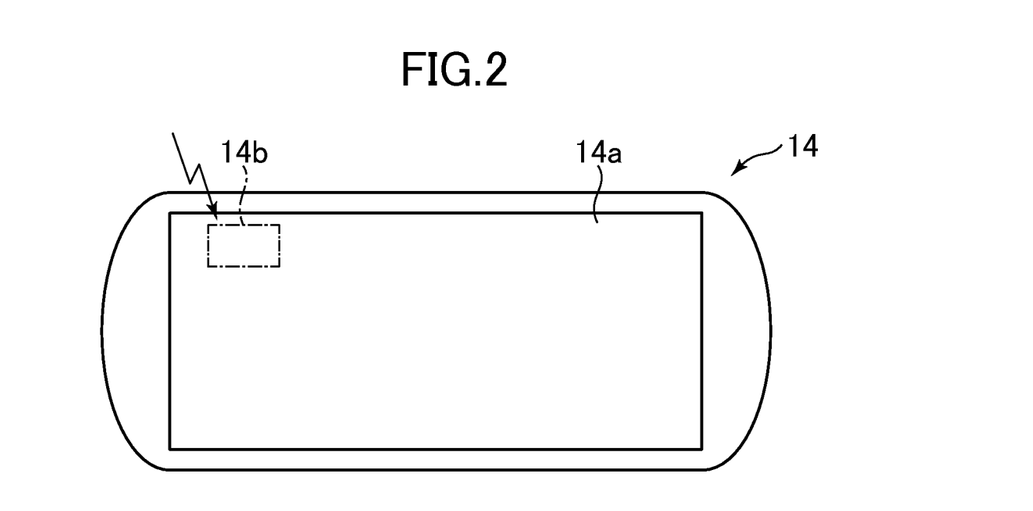
FIG. 2 is a diagram illustrating an example of the exterior appearance of a user terminal.

Each user terminal 14 is a portable computer game system driven on a battery, and includes a touch screen 14a in the front as in FIG. 2, which illustrates an example of the exterior appearance of the user terminal 14. The user terminal 14 has a built-in wireless LAN communication unit 14b for holding data communication that uses a wireless LAN (e.g., Wi-Fi (registered trademark)). In addition to this unit, the user terminal 14 includes, for example, a control unit, a memory unit, and buttons. The control unit is a program control device such as a CPU that operates as programmed by a program installed in the user terminal 14. The memory unit includes, for example, a memory element such as a ROM or a RAM, and a hard disk drive.

Figure 3:
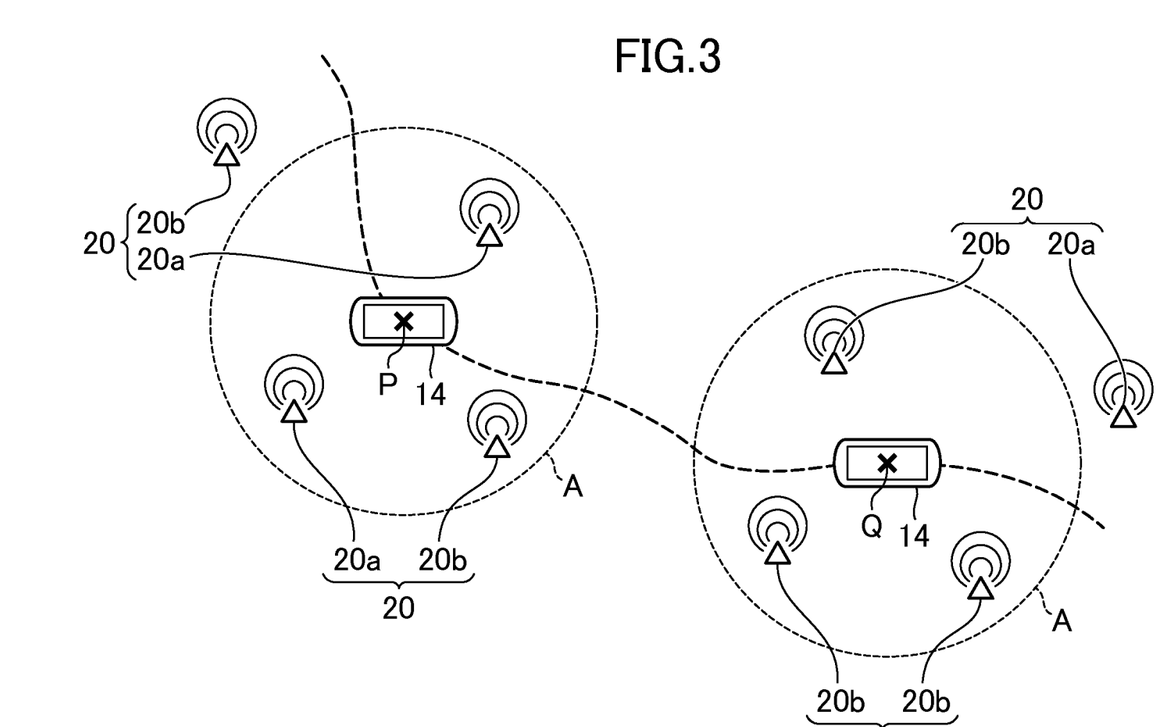
FIG. 3 is a diagram illustrating an example of the communication range of the user terminal.

In a communication range A of the wireless LAN communication unit 14b, which is a built-in component of the user terminal 14 according to this embodiment, at least one access point 20 is possibly present as illustrated in FIG. 3. Which access point 20 is present in the communication range A of the wireless LAN communication unit 14b may change as the user terminal 14 travels (for example, moves from a point P illustrated in FIG. 3 to a point Q of FIG. 3) by, for example, being carried by the user.

The access points 20 present in the communication range A of the wireless LAN communication unit 14b may include both the access point 20 that can relay communication between this user terminal 14 and the computer network 10 (e.g., the access point 20 provided by a provider to which the user of the user terminal 14 subscribes) and the access point 20 that cannot relay communication between this user terminal 14 and the computer network 10 (e.g., the access point 20 provided by a provider to which the user of the user terminal 14 does not subscribe). The access point 20 that can relay communication between the user terminal 14 and the computer network 10 is hereinafter referred to as relay access point 20a, and the access point 20 that cannot relay communication between the user terminal 14 and the computer network 10 is hereinafter referred to as non-relay access point 20b.

In the case where the relay access point 20a is present in the communication range A of the wireless LAN communication unit 14b, for instance, when the user terminal 14 is at the point P of FIG. 3, the user terminal 14 according to this embodiment can hold communication to/from the location information providing server 12 via the relay access point 20a present in the communication range A by using the wireless LAN communication unit 14b. On the other hand, the user terminal 14 according to this embodiment cannot hold communication to/from the location information providing server 12 in the case where the relay access point 20a is not present in the communication range A of the wireless LAN communication unit 14b, for instance, when the user terminal 14 is at the point Q of FIG. 3.

The user terminal 14 according to this embodiment is capable of receiving a radio beacon (beacon) that is transmitted from the access point 20 that is present in the communication range A of the wireless LAN communication unit 14b and that includes identification information of this access point 20 (hereinafter referred to as access point ID), irrespective of whether the access point 20 is the relay access point 20a or the non-relay access point 20b. The MAC address of the access point 20 is given as an example of the access point ID. The user terminal 14 according to this embodiment receives the access point ID at predetermined timing (for example, at predetermined time intervals). The user terminal 14 according to this embodiment stores at least one access point ID received, as location-associated ID data, in association with the date and time of reception of the access point ID.

The location information providing server 12 according to this embodiment stores in advance an access point ID in association with location information of a location where the access point 20 that is identified by the access point ID is placed (the location information in this embodiment is, for example, a combination of the latitude and longitude of a location where this access point 20 is placed). The location information providing server 12 according to this embodiment receives from the user terminal 14 a location information transmission request that is associated with location-associated ID data including at least one access point ID, and then identifies the location of the user terminal 14 based on the location-associated ID data. When receiving location-associated ID data that includes one access point ID, for example, the location information providing server 12 identifies a location that is associated with the included access point ID as the location of the user terminal 14. When receiving location-associated ID data that includes two or more access point IDs, the location information providing server 12 identifies the center of gravity of locations that are associated with the two or more access point IDs as the location of the user terminal 14. The location information providing server 12 then transmits to the user terminal 14 location information (e.g., a combination of a latitude and a longitude) indicating the identified location.

Figure 4:
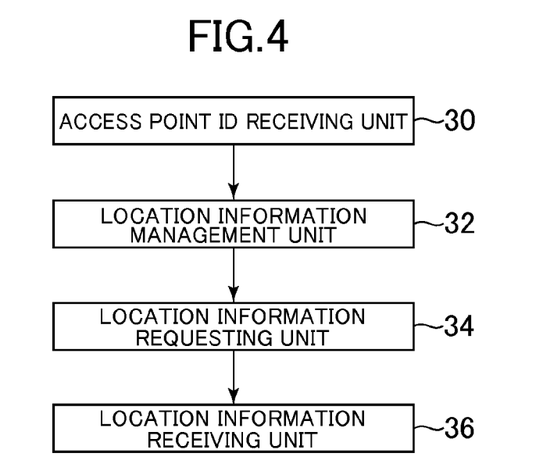
FIG. 4 is a function block diagram illustrating an example of functions that are implemented by the user terminal according to the embodiment of the present invention.

FIG. 4 is a function block diagram illustrating an example of functions of the user terminal 14 according to this embodiment. As illustrated in FIG. 4, the user terminal 14 according to this embodiment includes in terms of function an access point ID receiving unit 30, a location information management unit 32, a location information requesting unit 34, and a location information receiving unit 36, for example. The user terminal 14 according to this embodiment may have other functions than those illustrated in FIG. 4. In this embodiment, the access point ID receiving unit 30 and the location information receiving unit 36 are physically implemented by, for example, a reception unit of the wireless LAN communication unit 14b, the location information requesting unit 34 is physically implemented by, for example, a transmission unit of the wireless LAN communication unit 14b, and the location information management unit 32 is physically implemented by, for example, the control unit that is a CPU or the like. The user terminal 14 in this embodiment functions as the units of FIG. 4 by, for example, executing a program that is installed in the user terminal 14 that is a computer and that includes instructions corresponding to the functions of the units of FIG. 4 with the use of the control unit of the user terminal 14. The program is supplied to the user terminal 14 via, for example, a computer-readable information storage medium such as an optical disc, a magnetic disk, a piece of magnetic tape, a magneto-optical disk, or a flash memory, or via communication means such as the Internet.

The access point ID receiving unit 30 receives the access point ID of the access point 20 that is present in the communication range A of the user terminal 14 at predetermined timing (for example, at predetermined time intervals). The access point ID receiving unit 30 may be designed so as to receive a plurality of access point IDs at once at the predetermined timing.

Figure 5:
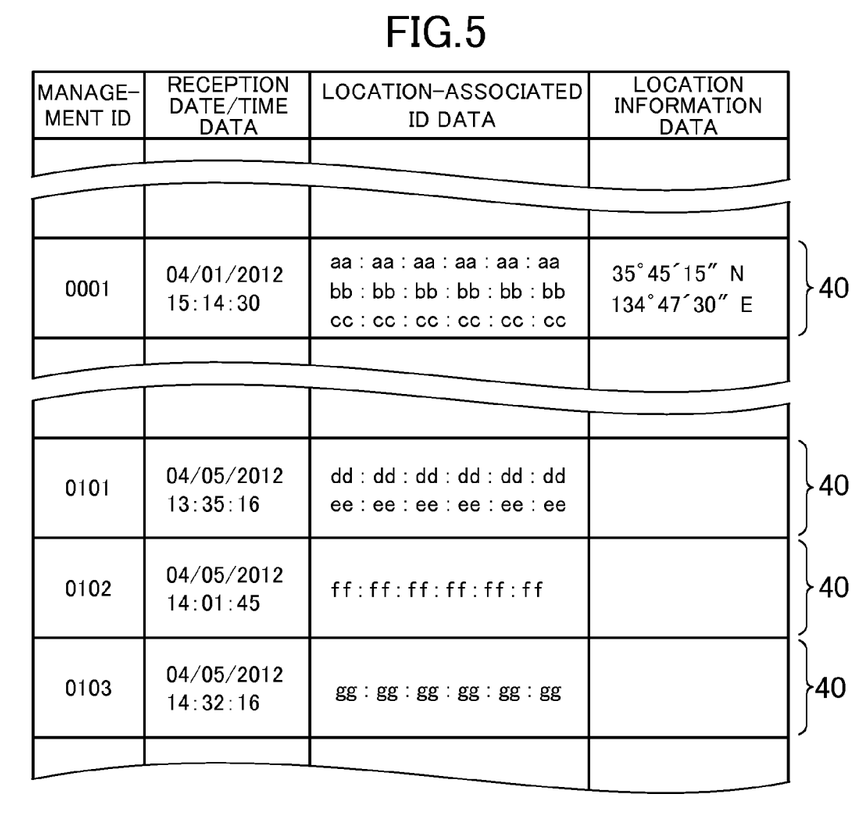
FIG. 5 is a diagram showing an example of location information management data.

When the access point ID receiving unit 30 receives the access point ID of at least one access point, the location information management unit 32 generates location information management data 40, an example of which is shown in FIG. 5, and stores the generated data in the memory unit of the user terminal 14. As shown in FIG. 5, each piece of the location information management data 40 includes a management ID that is identification information of the location information management data 40, reception time data that indicates the time of reception of the at least one access point ID received (in this embodiment, reception date/time data that indicates the date and time of reception, for example), location-associated ID data that includes the at least one access point ID received (FIG. 5 shows an MAC address as the at least one access point ID), and location information data whose value is null in the initial state. FIG. 5 shows three pieces of the location information management data 40 in which the value of the location information data is null. A time indicated by the reception time data can be expressed in any format. For instance, a time indicated by the reception time data may be expressed in seconds, in minutes, or in hours.

When communication between the user terminal 14 and the location information providing server 12 is possible, the location information requesting unit 34 transmits a location information transmission request that is associated with location-associated ID data to the location information providing server 12 via the relay access point 20*a*. The location information receiving unit 36 receives location information transmitted from the location information providing server 12. In this embodiment, when the location information receiving unit 36 receives location information, the location information management unit 32 sets the value of the location information as the value of the location information data included in the location information management data 40 that is associated with the received location information.

The user terminal 14 according to this embodiment performs processing of making an inquiry to the location information providing server 12 about location information. An example of the flow of the processing is described with reference to the exemplary flow chart of FIG. 6. In this embodiment, the user terminal 14 executes the processing of FIG. 6 at predetermined timing (for example, at predetermined time intervals).

Figure 6:
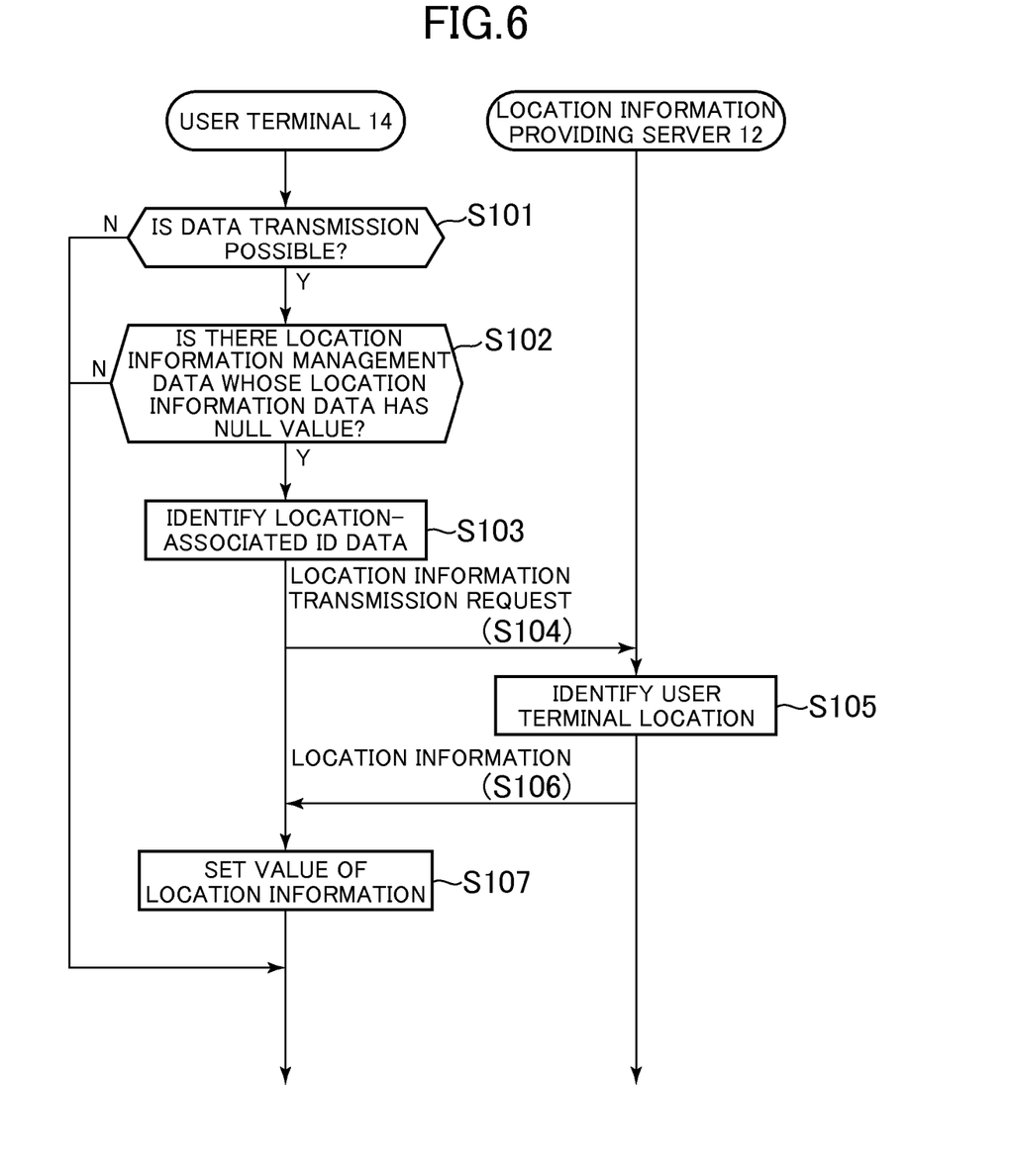
FIG. 6 is a flow chart illustrating an example of the flow of processing that is executed by the user terminal according to the embodiment of the present invention.

First, the location information requesting unit 34 checks whether or not data can be transmitted to the location information providing server 12 (for example, whether or not the relay access point 20*a* is present in the communication range A of the user terminal 14) (S101). To give a concrete example, the location information requesting unit 34 checks whether or not the location information providing server 12 has responded to access made to the location information providing server 12 by the user terminal 14. In the case where it is confirmed that data transmission to the location information providing server 12 is not possible (S101: N), the processing of this processing example is ended.

In the case where it is confirmed that location-associated ID data can be transmitted to the location information providing server 12 (S101: Yes), the location information requesting unit 34 checks whether or not the location information management data 40 whose location information data has a null value is found among pieces of the location information management data 40 that are stored in the user terminal 14 (S102). In the case where such location information management data 40 is not found among stored data (S102: N), the processing of this processing example is ended.

In the case where such location information management data 40 is found among stored data (S102: Y), the location information requesting unit 34 identifies location-associated ID data that is included in the location information management data 40 whose location information data has a null value (S103). In the case where there are a plurality of pieces of the location information management data 40 whose location information data has a null value as shown in FIG. 5, the location information requesting unit 34 identifies, for each of the plurality of pieces of the location information management data 40, location-associated ID data that is included in the piece of the location information management data 40 in S103. The location information requesting unit 34 then transmits to the location information providing server 12 a location information transmission request that is associated with the at least one location-associated ID data identified. The location information providing server 12 receives the location information transmission request (S104). The location information requesting unit 34 may transmit a location information transmission request to the location information providing server 12 via the relay access point 20*a* that is not the access point 20 identified by an access point ID that is associated with the location information transmission request (in the case where a plurality of access point IDs are associated with the location information transmission request, the relay access point 20*a* that is none of the access points 20 respectively identified by the plurality of access point IDs).

The location information providing server 12 identifies the location (e.g., latitude and longitude) of the user terminal 14 based on the location-associated ID data that is included in the received location information transmission request in the manner described above (S105). In the case where a plurality of pieces of location-associated ID data are associated with the received location information transmission request, the location of the user terminal 14 is identified based on each of the plurality of pieces of location-associated ID data.

The location information providing server 12 transmits location information that indicates the identified location to the user terminal 14. The location information receiving unit 36 of the user terminal 14 receives the location information (S106).

The location information management unit 32 of the user terminal 14 sets the value of the location information received in S106 (e.g., latitude and longitude) as the value of location information data included in the corresponding location information management data 40 (S107). In this embodiment, location information identified based on location-associated ID data is thus associated with the time of reception (reception date/time in this embodiment) of at least one access point ID that is included in the location-associated ID data.

There can be many variations to how a location information transmission request is associated with location-associated ID data in the case where a plurality of pieces of location-associated ID data are identified in S103 of the processing example given above.

For instance, the location information requesting unit 34 may transmit, to the location information providing server 12, as a location information transmission request, a packet in which a plurality of pieces of location-associated ID data are arranged in chronological (or reverse chronological) order of their associated reception dates/times. In this case, the user terminal 14 transmits a plurality of pieces of location-associated ID data at once as one packet to the location information providing server 12. The location information providing server 12 may transmit to the user terminal 14, for example, a packet in which pieces of location information that are associated are arranged in the arrangement order of the pieces of location-associated ID data in the received packet of the location information transmission request. The location information management unit 32 in this case may identify, for example, for each of the pieces of location information in the received packet, the location information management data 40 in which the value of the piece of location information is set as the value of the location information data, based on the arrangement order of the pieces of location information in the received packet.

To give another example, the location information requesting unit 34 may transmit to the location information providing server 12 a plurality of location information transmission requests at once that are associated with combinations of a piece of location-associated ID data and a management ID associated with the piece of location-associated ID data. In this case, the location information providing server 12 may transmit, to the user terminal 14, for each piece of location-associated ID data, location information that is identified based on the piece of location-associated ID data, in association with a management ID that is associated with the piece of location-associated ID data in the relevant location information transmission request. The location information management unit 32 in this case may identify, for example, for each piece of location information received, the location information management data 40 in which the value of the piece of location information is set as the value of the location information data, based on a management ID that is associated with the received piece of location information.

In the case where a plurality of pieces of location-associated ID data are identified, the location information requesting unit 34 in this embodiment thus transmits the plurality of pieces of location-associated ID data at once to the location information providing server 12.

How a location information transmission request is associated with location-associated ID data in the case where a plurality of pieces of location-associated ID data are identified in S103 of the processing example given above is not limited to the modes described above.

In this embodiment, an access point ID received from the non-relay access point 20b during a period in which the user terminal 14 cannot hold communication to/from the location information providing server 12 is transmitted to the location information providing server 12 when communication between the user terminal 14 and the location information providing server 12 is possible. Location information based on this access point ID is then provided by the location information providing server 12 to the user terminal 14. In this manner, the user terminal 14 according to this embodiment can identify where the user terminal 14 has been located during a period in which the user terminal 14 cannot hold communication to/from the location information providing server 12, based on an access point ID received during this period.

In this embodiment, when there are a plurality of pieces of the location information management data 40 to which the value of the location information data has not been set, pieces of location-associated ID data respectively included in the plurality of pieces of the location information management data 40 are transmitted at once to the location information providing server 12. The pieces of location information data that are included in the plurality of pieces of location information management data 40 to which the value of the location information data has not been set can thus be set at once in this embodiment.

In this embodiment, at least one access point ID is associated with the reception date/time of the access point ID. Location information that is identified based on the at least one access point ID is then associated with the reception date/time associated with the at least one access point ID. This embodiment thus enables associating a location that is indicated by location information received from the location information providing server 12 with the reception date/time of an access point ID that is associated with the indicated location, irrespective of the reception date/time of the location information.

The location information providing server 12 in this embodiment identifies, as the location of the user terminal 14, a location where the access point 20 that is identified by a received access point ID is placed, or the center of gravity of locations where the access points 20 that are respectively identified by a plurality of access point IDs received are placed, and transmits location information indicating the identified location to the user terminal 14. The reception date/time of an access point ID associated with a location that is indicated by location information received from the location information providing server 12 is therefore presumed in this embodiment as a date/time when the user terminal 14 is likely to have been at (or in the vicinity of) the indicated location. This embodiment thus enables associating a location that is indicated by location information received from the location information providing server 12 with a date/time when the user terminal 14 is likely to have been at (or in the vicinity of) the indicated location, irrespective of the reception date/time of the location information.

In this embodiment, the user terminal 14 can store location information that indicates a travel history of the user terminal 14 even when the user terminal 14 does not have a positioning unit for measuring the location (latitude and longitude) of the user terminal 14 by utilizing the Global Positioning System (GPS).

It is common in services that provide information based on the current location of the user terminal 14 to use the current location of the user terminal 14 that is measured by utilizing the GPS. The GPS, however, generally takes long to capture the current location of the user terminal 14. In addition, measuring the current location of the user terminal 14 with the use of the GPS is not possible in places where radio waves transmitted from a GPS satellite do not reach, such as indoor or underground places.

Equipping the user terminal 14 with the positioning unit for measuring the location of the user terminal 14 by utilizing the GPS also means an increase in the number of parts and in the cost of parts. Mounting the positioning unit externally to the user terminal 14 that does not have the GPS increases the overall size of the user terminal 14.

When the location of the user terminal 14 is identified with the use of radio waves that are transmitted from wireless LAN (e.g., Wi-Fi (registered trademark)) access points as in this embodiment, even the user terminal 14 that is not equipped with the positioning unit can use services that provide information based on the current location of the user terminal 14. In addition, services that provide information based on the current location of the user terminal 14 can be used in places where radio waves transmitted from a GPS satellite do not reach. Moreover, the user terminal 14 that is not equipped with the positioning unit is reduced in the number of parts and the cost of parts compared to the user terminal 14 that is equipped with the positioning unit.

The present invention is not limited to the embodiment described above.

For instance, the user terminal 14 may further include a cellular phone communication unit for holding data communication that uses a cellular phone network. In this case, the information processing system according to this embodiment may use the access point IDs of the access points 20 of a cellular phone network, instead of the access point IDs of the access points 20 of a wireless LAN, to execute the processing of the embodiment described above. Alternatively, the information processing system according to this embodiment may use the access point IDs of the access points 20 of a cellular phone network, along with the access point IDs of the access points 20 of a wireless LAN, to execute the processing of the embodiment described above.

For example, in response to the reception of at least one access point ID in the access point ID receiving unit 30, the location information management unit 32 of the user terminal 14 may generate the location information management data 40, which is to be stored in the memory unit of the user terminal 14, so that location-associated ID data included in the location information management data 40 includes at least one combination of the received access point ID and a value indicating the signal strength of a radio wave (beacon) that carries the access point ID (in other words, the signal strength of a beacon from the access point 20 that is identified by the received access point ID) (for example, Received Signal Strength Indication (RSSI)) (hereinafter referred to as signal strength value). The user terminal 14 then transmits the location-associated ID data to the location information providing server 12.

The location information providing server 12 may identify the location of the user terminal 14 by weighting the access point location with the signal strength value and combining the location of each access point 20 that is identified by the at least one access point ID. The location information providing server 12 then transmits location information that indicates the identified location to the user terminal 14.

Consider an example in which the location information providing server 12 has a function of identifying the location of the user terminal 14 based on a combination of an access point ID and a signal strength value as the one disclosed in U.S. Pat. No. 8,145,255. In this example, the location information providing server 12 receives from the user terminal 14 a location information transmission request associated with location-associated ID data that includes three combinations of an access point ID and a signal strength value. The information stored in the location information providing server 12 uses "A1", "A2", and "A3", respectively, to represent the locations of the access points 20 that are identified by the three access points IDs. The location information providing server 12 in this case identifies a location O of the user terminal 14 as, for example, $O=(W1 \times A1+W2 \times A2+W3 \times A3)/(W1+W2+W3)$, where $Wi=1/distS(O, Ai)$ (i=1, 2, 3). The value of $distS(O,Ai)$ indicates the distance between the user terminal 14 and the i-th access point that is estimated from the signal strength value of a signal received from the i-th access point. The location information providing server 12 then transmits location information that indicates the identified location to the user terminal 14.

How the location of the user terminal 14 is identified is not limited to the methods described above. For instance, the location information providing server 12 may identify the location of the access point 20 that is the sender of a beacon that has the highest signal strength among received beacons as the location of the user terminal 14. To give an example, when a signal strength value associated with a first access point ID is −60 dBm, a signal strength value associated with a second access point ID is −50 dBm, and a signal strength value associated with a third access point ID is −40 dBm, the location information providing server 12 may identify the third access point 20 as the location of the user terminal 14. Alternatively, the location information providing server 12 may identify, as the location of the user terminal 14, a location at the center of the access points 20 that are the senders of beacons whose signal strengths at the time of reception are equal to or more than a predetermined threshold.

A location indicated by location information can be expressed in other formats than the latitude and the longitude. For instance, the location information providing server 12 may transmit location information that indicates an X coordinate value and a Y coordinate value or location information that indicates an address to the user terminal 14. The combination of an X coordinate value and a Y coordinate value or a letter string representing an address may be set as the value of the location information data in this case.

Various uses are conceivable for the location information management data 40 described above.

For instance, a plurality of user terminal 14 may upload pieces of the location information management data 40 stored in the respective user terminals 14 to a server connected to the computer network 10 (hereinafter referred to as user location management server). The user location management server may manage, for each of the plurality of user terminals 14, a travel history of the user terminal 14 (history combining a date/time with the location of the user terminal 14 at the date/time). The user location management server in this case may, for example, notify the user terminal 14 in question of the identification information of another user terminal 14 that is within a given distance from the location of the user terminal 14 in question.

The user location management server may also provide the user terminal 14 with, for example, data useful to the user of the user terminal 14 (e.g., data of an item that can be used in a game program installed in the user terminal 14) when the user terminal 14 satisfies a given condition about a location (e.g., when the user terminal 14 is within a given distance from an organization that runs the server or a location set by the user of another user terminal 14).

To give another example, when the user terminal 14 includes a camera and a subject is photographed with the camera, the user terminal 14 may store an image generated by the camera in the memory unit of the user terminal 14 in association with the location information management data 40 that includes the photographing date/time of the image as the reception date/time data, and that includes at least one access point ID received at the photographing date/time of the image as the location-associated ID data. The user terminal 14 then transmits this location-associated ID data to the location information providing server 12 when communication between the user terminal 14 and the location information providing server 12 is possible, and receives location information that is identified based on the location-associated ID data from the location information providing server 12 as described above. The user terminal 14 sets the value of the received location information as the value of the location information data of the location information management data 40 in which the location-associated ID data that is the basis of the identification of the received location information is included.

Thereafter, the user terminal 14 may transmit each of a plurality of images photographed by the camera of the user terminal 14 to a server connected to the computer network 10 (hereinafter referred to as image sharing server), in association with the photographing date/time of the image and location information that is identified based on at least one access point ID received at the photographing date/time. In response to a request received from another user terminal 14, the image sharing server provides the image associated with the photographing date/time and with the location information to the other user terminal 14.

The concrete letter strings and numerical values in the description given above and concrete letter strings in the drawings are examples, and the present invention is not limited to those letter strings and numerical values.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing terminal, comprising:
a reception unit;
a transmission unit; and
a control unit,
wherein the reception unit receives, from an access point, identification information of the access point,
wherein the control unit associates identification information of at least one access point with reception time information that indicates a time of reception of the identification information,
wherein the transmission unit transmits, to a server that transmits, in response to reception of the identification information, location information based on the identification information, identification information that is associated with the reception time information, wherein the reception unit receives, from the server, location information based on the transmitted identification information, and wherein the control unit associates the received location information with the reception time information that is associated with the transmitted identification information.

2. The information processing terminal according to claim 1, wherein the transmission unit transmits, to the server, a plurality of pieces of identification information at once that are associated with pieces of reception time information that indicate reception times different from one another, and wherein the reception unit receives, from the server, for each of the plurality of pieces of identification information transmitted at once, location information based on the each of the plurality of pieces of identification information.

3. The information processing terminal according to claim 1, wherein the transmission unit transmits, to the server, via an access point that is different from an access point identified by identification information that is associated with the reception time information, the identification information that is associated with the reception time information.

4. The information processing terminal according to claim 2, wherein the transmission unit transmits, to the server, via an access point that is different from an access point identified by identification information that is associated with the reception time information, the identification information that is associated with the reception time information.

5. The information processing terminal according to claim 1, further comprising a memory unit for storing a plurality of pieces of information in which identification information of at least one access point is associated with reception time information that indicates a time of reception of the identification information.

6. An information processing method, comprising:
  receiving, from an access point, identification information of the access point;
  associating identification information of at least one access point with reception time information that indicates a time of reception of the identification information;
  transmitting, to a server that transmits, in response to reception of the identification information, location information based on the identification information, identification information that is associated with the reception time information;
  receiving, from the server, location information based on the transmitted identification information; and
  associating the received location information with the reception time information that is associated with the transmitted identification information.

7. A non-transitory, computer readable storage medium containing a program which is to be executed by a computer, the program including instructions to:
  receive, from an access point, identification information of the access point;
  associate identification information of at least one access point with reception time information that indicates a time of reception of the identification information;
  transmit, to a server that transmits, in response to reception of the identification information, location information based on the identification information, identification information that is associated with the reception time information;
  receive, from the server, location information based on the transmitted identification information; and
  associate the received location information with the reception time information that is associated with the transmitted identification information.

* * * * *